United States Patent [19]
Blennert

[11] Patent Number: 5,518,083
[45] Date of Patent: May 21, 1996

[54] SWING ARM TREE STAND

[76] Inventor: George Blennert, 740 E. Taylor St., Medford, Wis. 54451

[21] Appl. No.: 407,390
[22] Filed: Mar. 20, 1995
[51] Int. Cl.⁶ .................................................. A01M 31/02
[52] U.S. Cl. ........................... 182/188; 248/282.1
[58] Field of Search .................................. 182/187, 188; 248/231, 219.4, 282, 240, 282.1

[56] References Cited

U.S. PATENT DOCUMENTS

| | | | |
|---|---|---|---|
| 1,375,166 | 4/1921 | Mestee | 248/282 X |
| 1,722,402 | 7/1929 | Veilleux | 182/187 X |
| 1,892,813 | 1/1933 | Sheldon | 248/282 |
| 2,975,998 | 3/1961 | Clift | 248/219.4 X |
| 3,376,007 | 4/1968 | Chesterley | 248/282 |
| 4,489,910 | 12/1984 | Ferguson | 248/231 X |
| 4,721,183 | 1/1988 | Koniecka | 182/187 |
| 4,856,741 | 8/1989 | Schaefer | 248/282 X |
| 5,131,496 | 7/1992 | White | 182/187 |
| 5,172,881 | 12/1992 | Stein | 248/231 |

*Primary Examiner*—Alvin C. Chin-Shue
*Attorney, Agent, or Firm*—Donald Cayen

[57] ABSTRACT

A swing arm tree stand comprises a base that is held to a tree by chains or the like. The chains are guided within rails on the base. A pair of lugs secured to the base pivotally support an arm between them. A seat is fastened to the distal end of the arm. The base has pointed tabs that dig into the tree to prevent the base from tilting when a hunter seated on the seat swings the arm from side to side. In a modified embodiment, a second arm is pivotally supported on the distal end of the first arm, and the seat is fastened to the distal end of the second arm. Arcuate strips may be substituted on the base for the pointed tabs. The strips partially encircle the tree to prevent tilting of the base on the tree.

1 Claim, 3 Drawing Sheets

SWING ARM TREE STAND

BACKGROUND OF THE INVENTION

1. Field of the Invention

This invention pertains to outdoor sports, and more particularly to apparatus useful for hunting.

2. Description of the Prior Art

Various types of equipment have been developed to help hunters spot large game animals. Especially important aids are tree stands, which enable hunters to sit at an elevated location while they wait for their quarry to come into view. Accordingly, tree stands are well known and are in widespread use.

To be useful, a tree stand must fulfill several requirements. One important requirement is that it provide the hunter with freedom of movement. Since the game animal does not necessarily appear in front of the seated hunter, he must be able to move sideways relative to the tree while remaining seated. Further, for all positions of the hunter, he must be relaxed, braced, and comfortable in order to have a chance for a successful shot. Finally, of course, the tree stand must be safe regardless of the position of the hunter relative to the tree.

To satisfy the foregoing requirements, tree stands have been designed in a variety of configurations. Some tree stands include a ladder-like arrangement that enables the hunter to climb to a seat high above the ground. Ladder tree stands are usually collapsible to enable them to be easily transported. They can be either free standing or designed to lean against a vertical object such as a tree. The foldable ladder tree stands have the advantage of combining a climbing device and seat in a single package. On the other hand, such tree stands are expensive, bulky, and time consuming to collapse and erect.

Other tree stands comprise only a base that is held to a tree and a seat that is supported by the base. That type of tree stand is relatively small, inexpensive, and easy to carry. It can be held to a tree near the ground if the hunter does not want to hunt from an elevated location or if he merely wants to rest.

An example of the latter type of tree stand is shown in U.S. Pat. No. 4,819,763. The tree stand of that patent has two vertically spaced support elements that are held to a tree. An arm is swingable relative to the support elements. The arm supports a seat that is located close to the support elements and that is pivotable relative to the arm. A hunter sitting on the seat can swing from side to side relative to the tree by means of the arm, and he can also pivot relative to the arm by means of the seat. Although the tree stand of the 4,819,763 patent does provide for movement of the hunter, such movement is limited because of the close proximity of the seat to the support elements and the tree.

U.S. Pat. No. 5,269,395 shows a tree stand in which an arm is rigidly held in a mounting bar. A seat is pivotally supported on the arm. A hunter can pivot 360 degrees on the seat, but the arm cannot move relative to the tree. Consequently, the tree stand of the 5,269,395 patent is of limited usefulness.

Thus, a need exists for improvements in hunters' tree stands.

Summary of the Invention

In accordance with the present invention, a swing arm tree stand is provided that gives a hunter a wider range of movement than was previously possible. This is accomplished by apparatus that includes a seat located at the distal end of one or more pivotable arms.

In one embodiment of the invention, a single arm is used. One end of the arm is pivotally supported between two lugs secured to a base. A flat pad is joined immovably to the distal end of the arm. A boat seat or similar seat is fastened to the pad. When the base is held to a tree, a hunter sitting on the seat is at a relatively far distance from the tree. By swinging the arm from side to side, the hunter can increase his range of view of the surrounding area.

In another embodiment, two arms are used. A first arm is pivotally supported between a pair of lugs. To the distal end of the first arm is pivotally supported one end of a second arm. A seat is fastened to the distal end of the second arm. The double arm design greatly increases the hunter's movement and thus his range of view. If desired, two first arms can be used instead of one. In that case, the second arm is pivotally supported between the distal ends of the two first arms.

It is a feature of the present invention that the base is held to a tree in a secure manner. For that purpose, the base is comprised of a flat vertically oriented plate. The plate has a front surface to which the lugs are secured. Rails on the plate front surface guide chains or straps that wrap around the tree to hold the base in place. Extending laterally from both edges of the plate are two or more pairs of heavy strips. The strips are curved backwardly from the plate front surface. The strips conform to the contour of a typical tree. The strips resist the torque produced by the hunter's and prevent the base from tilting on the tree when the hunter swings from side to side on the arms.

In a variation of the base of the invention, the base is designed as a channel having a middle wall to which the lugs are secured. Along the free ends of the channel side walls are a number of pointed tabs. The channel is placed vertically against the tree with the tabs resting on the bark. As the chains or straps are tightened, the tab points dig into the tree. The tabs safely prevent the tree stand from tilting as the hunter swings from side to side.

The method and apparatus of the invention, using a seat on the distal end of one or more swingable arms supported between at least two lugs, thus greatly increases the range of view of a hunter while he remains comfortably seated. The tree stand is held safely to a tree even though the hunter swings from side to side.

Other advantages, benefits, and features of the present invention will become apparent to those skilled in the art upon reading the detailed description of the invention.

Detailed Description of the Preferred Embodiment

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
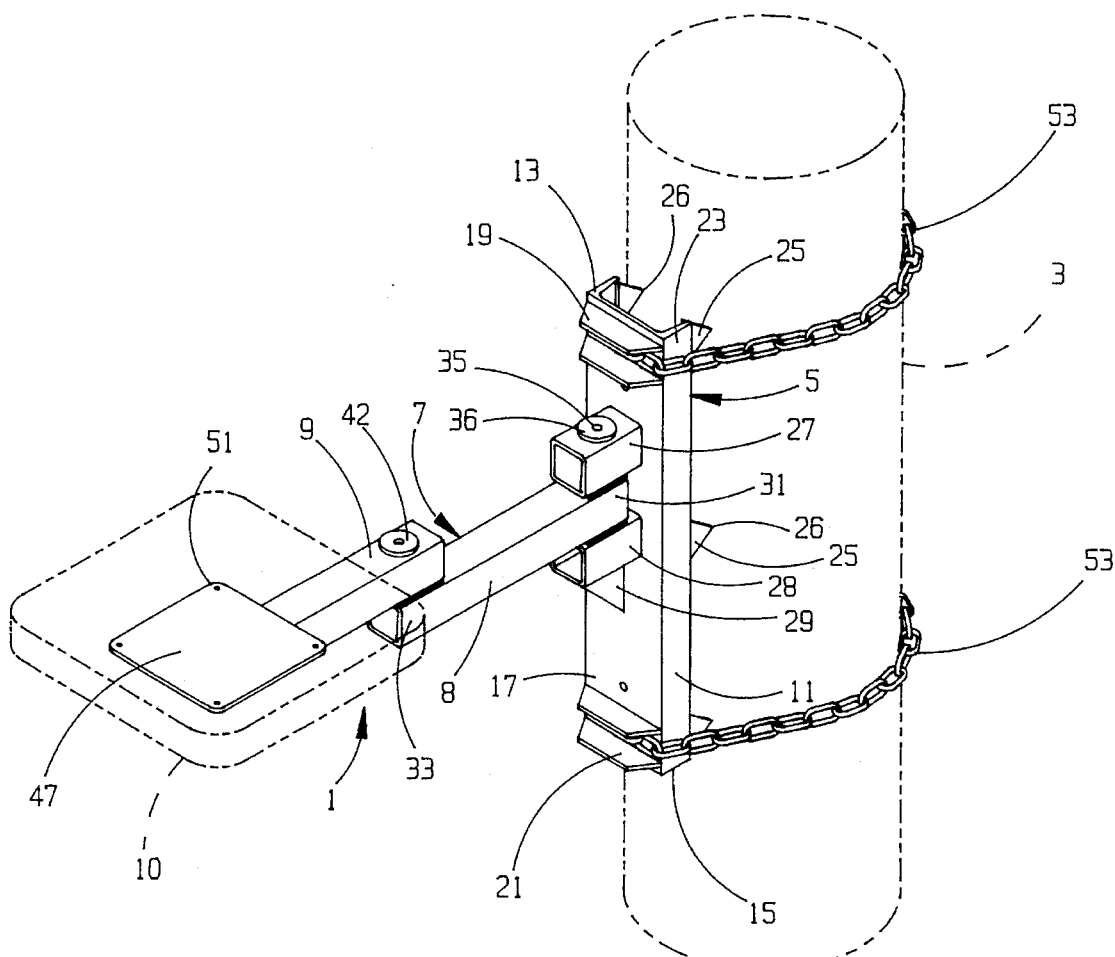
FIG. 1 is a perspective view of the present invention.
Figure 2:
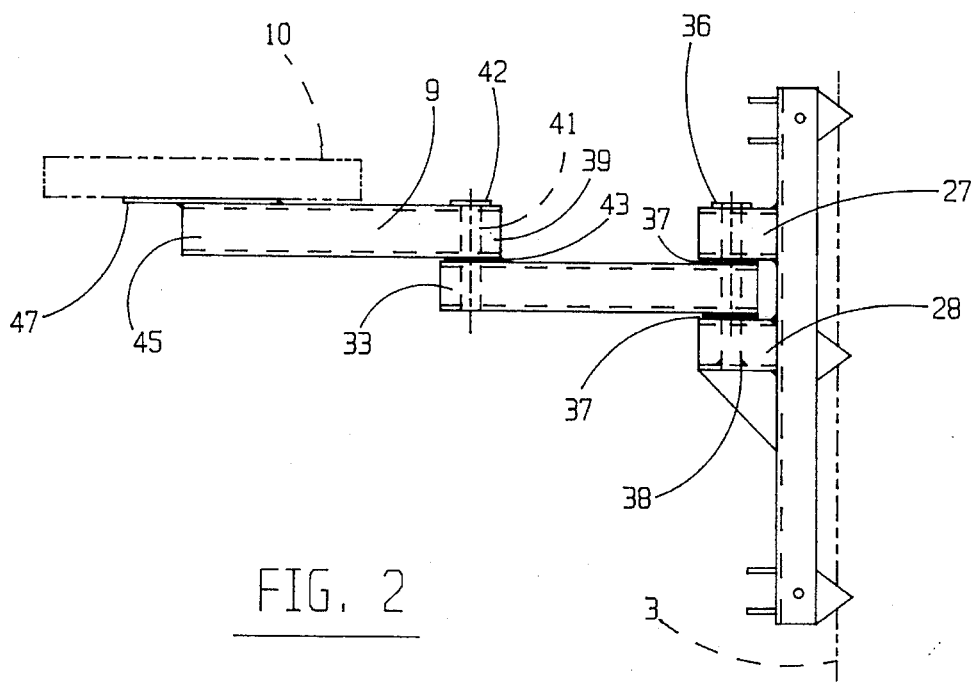
FIG. 2 a side view of the invention.

Referring to FIGS. 1 and 2, a swing arm tree stand 1 is illustrated that includes the present invention. The swing arm tree stand 1 is particularly useful for enabling hunters to be comfortably seated at elevated positions on a tree 3. However, it will be understood that the invention is not limited to sports related applications.

The swing arm tree stand 1 is comprised of a base 5 to which is pivotally supported a swing arm 7. In the construction illustrated in FIGS. 1 and 2, the base 5 is made from a channel 11 having top and bottom ends 13 and 15, respectively. Welded or otherwise secured on the middle wall 17 of the channel 11 near its top end 13 are a pair of vertically spaced rails 19. A similar pair of rails 21 are secured to the channel middle wall 17 near its bottom end 15. On the free ends of the channel side walls 23 are a number of tabs 25. Each tab 25 terminates in a respective sharp point 26. Also secured to the channel middle wall are a pair of vertically spaced lugs 27 and 28. Preferably, one or more gussets 29 are used to help secure the lug 28 to the channel.

The swing arm 7 includes a first arm 8, a second arm 9, and a seat 10. The first arm 8 has a first end 31 and a second end 33. The first arm first end 31 is pivotally supported between the two lugs 27 and 28 by a pin 35. A flat washer 36 is welded to the upper end of the pin 35. The lower end of the pin is welded to the bottom wall 38 of the lug 28. Nylon washers 37 are placed between the two lugs and the associated sides of the first arm. The second arm 9 has a first end 39 that is pivotally supported on the second end 33 of the first arm 8 by a pin 41 and washer 42. A nylon washer 43 is placed between the first and second arms. In that manner, the first and second arms swing relative to each other and to the base 5. A pad 47 is joined to the second arm distal end 45.

The seat 10 is located at the distal end 45 of the second arm 9. The seat is fastened to the pad 47. The seat is preferably a boat seat or similar type of cushioned seat. The seat can be fastened to the pad by conventional fasteners, not shown, passing through appropriate holes 51 in the pad, In use, the base 5 of the swing arm tree stand 1 is placed such that the points 26 of the tabs 25 are in contact with the tree 3. A pair of chains or straps 53 are wrapped around the tree and are guided within the base rails 19 and 21. The chains or straps 53 are tightened in known manner to cause the tab points to penetrate into the tree. When the chains or straps are fully tightened a hunter can sit on the seat 10 in straps are fully tightened, a hunter can sit on the seat 10 in comfort and safety. At the same time, the arms 8 and 9 enable him to swing from side-to-side with maximum movements around the tree, and the tabs resist the torque produced as the hunter swings such that the base does not tilt on the tree.

Figure 3:
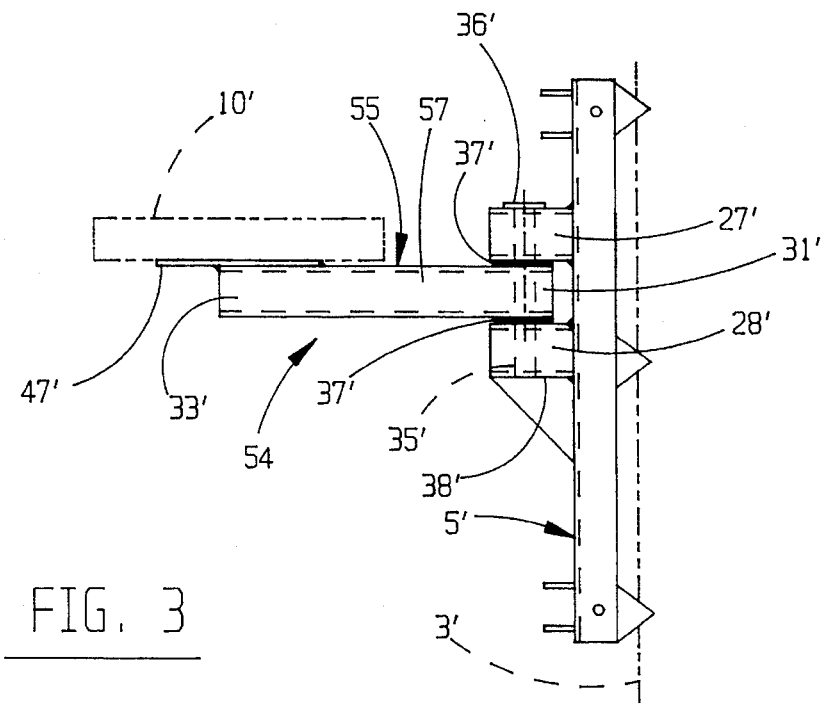
FIG. 3 is a side view of a modified embodiment of the invention.

In some applications, maximum hunter movement on a tree stand may not be necessary. In those instances, a swing arm tree stand having a single arm may be sufficient. Looking at FIG. 3, a swing arm tree stand 54 has a base 5' that is substantially similar to the base 5 described previously in connection with the swing arm tree stand 1 of FIGS. 1 and 2. The base 5' pivotally supports the first end 31' of an arm 57 by means of a pin 35' and washers 37'. Joined to the distal end 33' of the arm 57 is a pad 47'. A seat, such as a boat seat 10', is fastened to the pad 47'. The swing arm tree stand 54 functions in generally the same manner as the swing arm tree stand 1 described previously.

Figure 4:
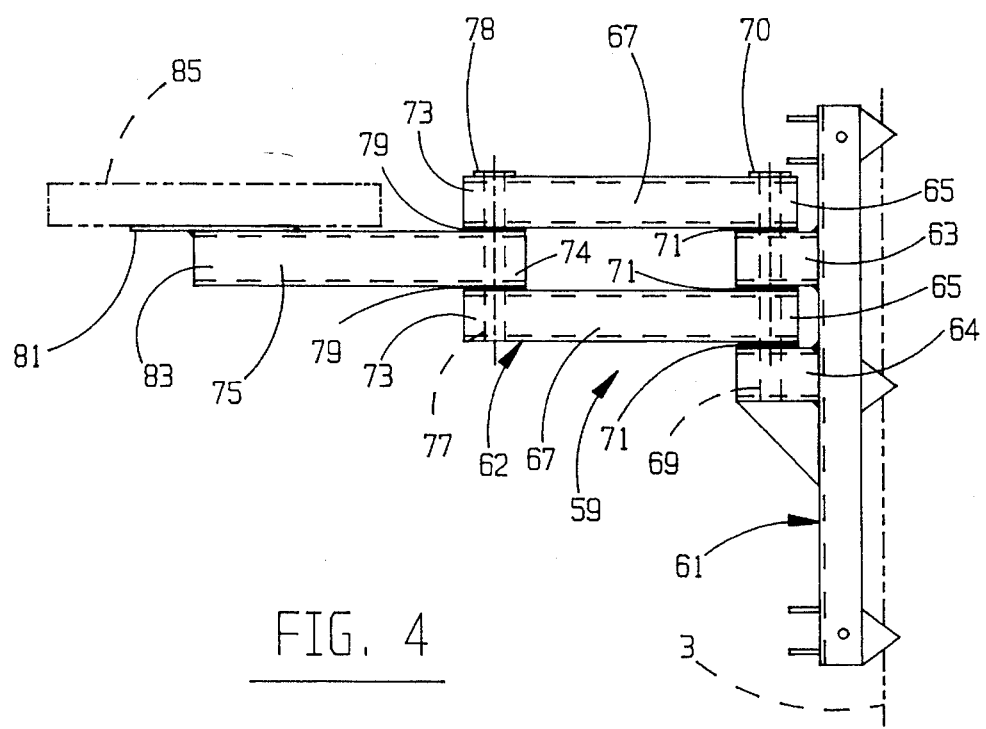
FIG. 4 is a side view of a further modified embodiment of the invention.

Now looking at FIG. 4, a swing arm tree stand 59 is shown that has a base 61 and a swing arm 62. The base 61 is substantially similar to the bases 5 and 5' depicted previously in conjunction with FIGS. 1–3. The base 61 includes two lugs 63 and 64. The lugs 63 and 64 pivotally support the respective first ends 65 of two first arms 67 of the swing arm 62 by a long pin 69 with a washer 70 welded to it. Nylon washers 71 are used in the joints between the lugs and the first arms 67.

Pivotally supported between the second ends 73 of the two first arms 67 is the first end 74 of a second arm 75. A long pin 77 with a washer 78 welded to it and nylon washers 79 assure a strong but easily pivotable connection between the arms 67 and 75. A pad 81 is fastened to the second end 83 of the second arm. A seat, such as a boat seat 85, is fastened to the pad 81. The swing arm tree stand 59 combines maximum movement for a hunter with exceptional strength of the swing arm 62.

Figure 5:
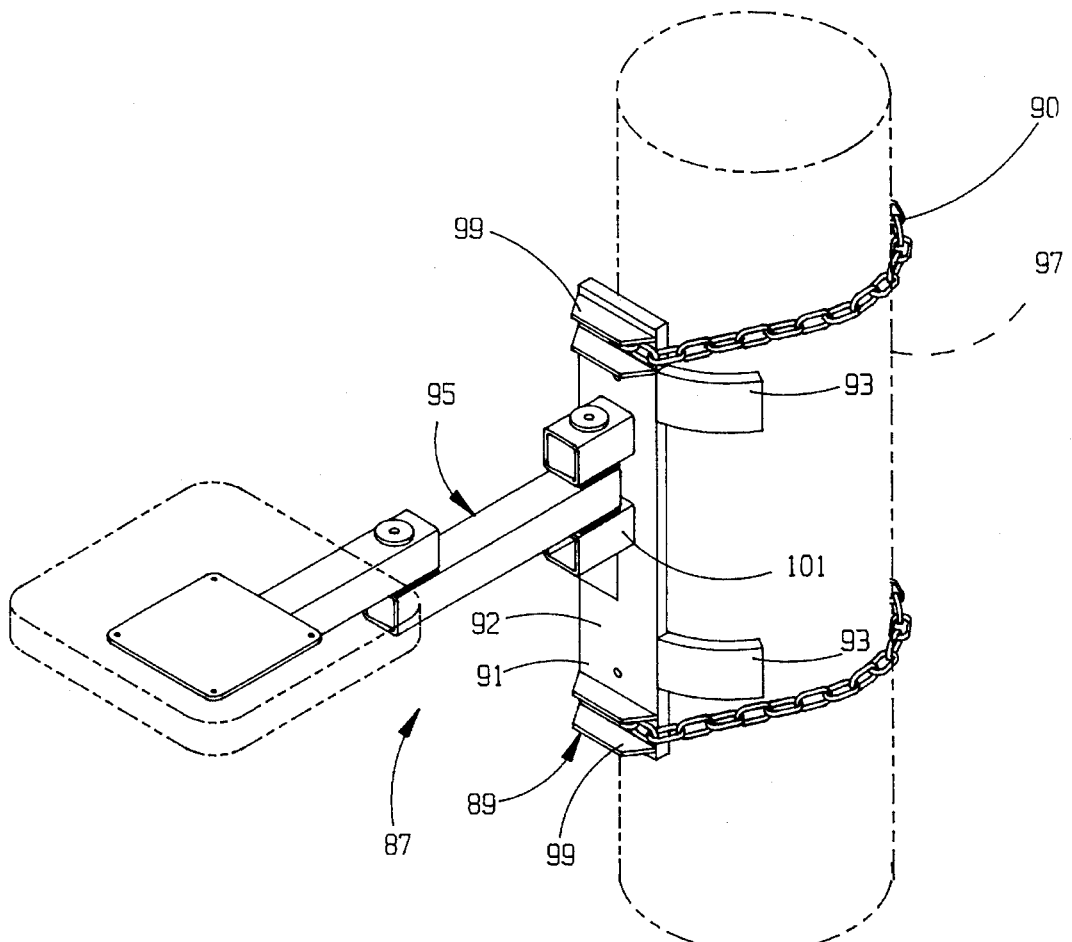
FIG. 5 is a view similar to FIG. 1, but showing an alternate design for the base of the present invention.
Figure 6:
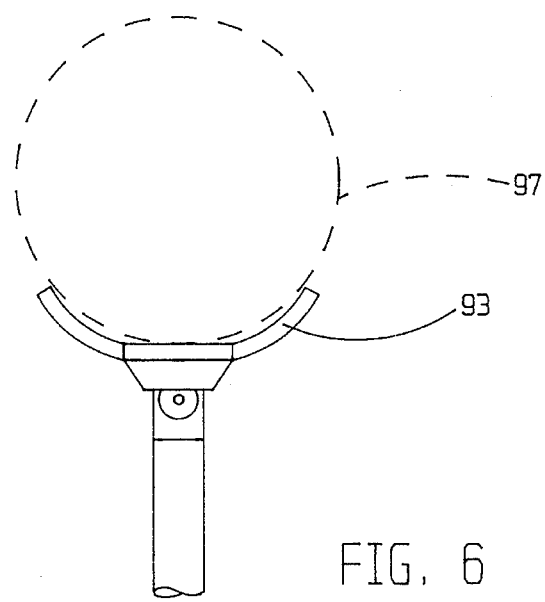
FIG. 6 is a top view of FIG. 5.

Further in accordance with the present invention, the swing arm tree stand can be manufactured with a base that partially wraps around a tree. Turning to FIGS. 5 and 6, a swing arm tree stand 87 is depicted that has a base 89 in the form of a flat plate 91. The plate 91 has a front surface 92. A pair of lugs 101 are secured to the plate front surface 92. The base 89 also has rails 99 similar to the rails 19 and 21 of the swing arm tree stand 1 of FIG. 1. (For clarity, the chains 90 of FIG. 5 are not shown in FIG. 6.)

At least two pairs of heavy strips 93 are attached to and extend laterally from the base plate 91. The strips 93 are generally arcuate in shape and curve in the opposite direction of the plate front surface 92. The curve of the strips is designed to enable them to partially encircle the outer diameter of a typically sized tree 97. The strips resist the torque created when a hunter swings from side to side on the swing arm 95. The strips thus prevent the swing arm tree stand 87 from tilting on the tree when a hunter swings from side-to-side.

The swing arm 95 shown with the base 89 of the swing arm tree stand 87 is substantially similar to the swing arm 7 of the swing arm tree stand 1 of FIGS. 1 and 2. However, it will be appreciated that the swing arm used with the base 89 can also have the configuration of the swing arm 55 of the swing arm tree stand 54 of FIG. 3, or of the swing arm 62 of the swing arm tree stand 59 of FIG. 4.

In summary, the results and advantages of tree stands can now be more fully realized. The swing arm tree stand of the invention provides exceptional freedom of movement for a hunter while he is comfortably seated. This desirable result comes from pivoting the swing arm about an axis located close to a tree. Especially in the designs in which two arms are used for the swing arm, the hunter has a maximum range of side-to-side movement. The pointed tabs 25 or the curved strips 93 safely hold the swing arm tree stand in place even when the hunter swings the swing arm to its maximum side locations.

It will also be recognized that in addition to the superior performance of the swing arm tree stand of the invention, its construction is such as to cost little or no more than traditional tree stands. Consequently, it is affordable by the majority of hunters. Also, since the swing arm tree stand is of a simple design and made from rugged components, the need for maintenance is minimal.

Thus, it is apparent that there has been provided, in accordance with the invention, a swing arm tree stand that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A swing arm tree stand comprising:
   a. a base comprising:
      i. a plate having top and bottom ends, and front surface;
      ii. a pair of lugs secured to the plate front surface;
      iii. rail means secured to the plate front surface for guiding a chain or the like; and
      iv. strip means attached to the base for curving in a direction opposite the base front surface;
   b. arm means pivotally supported by the lugs for holding a person, wherein the arm means comprises:
      i. a first arm having a first end pivotally supported between the base lugs and a second end;
      ii. a second arm having a first end pivotally supported by the second end of the first arm and a second end; and
      iii. a seat fastened to the second end of the second arm; and
   c. a third arm having a first end pivotally connected to the base lugs and a second end pivotally connected to the first end of the second arm and to the second end of the first arm.

* * * * *